United States Patent
Luo et al.

(10) Patent No.: US 11,243,954 B2
(45) Date of Patent: Feb. 8, 2022

(54) METHOD TO AUTOMATICALLY JOIN DATASETS WITH DIFFERENT GEOGRAPHIC LOCATION NAMING CONVENTIONS

(71) Applicant: International Business Machines Corporation, Armonk, NY (US)

(72) Inventors: Lin Luo, Ontario (CA); Changying Sun, Ottawa (CA); Graham Wills, Naperville, IL (US); Mohammed Mostafa, Ontario (CA)

(73) Assignee: International Business Machines Corporation, Armonk, NY (US)

(*) Notice: Subject to any disclaimer, the term of this patent is extended or adjusted under 35 U.S.C. 154(b) by 66 days.

(21) Appl. No.: 16/785,314

(22) Filed: Feb. 7, 2020

(65) Prior Publication Data
US 2021/0248137 A1    Aug. 12, 2021

(51) Int. Cl.
*G06F 17/00* (2019.01)
*G06F 16/2455* (2019.01)
*G06F 16/28* (2019.01)

(52) U.S. Cl.
CPC ........ *G06F 16/2456* (2019.01); *G06F 16/285* (2019.01)

(58) Field of Classification Search
CPC ............................ G06F 16/2456; G06F 16/285
See application file for complete search history.

(56) References Cited

U.S. PATENT DOCUMENTS

| 8,452,277 | B2 | 5/2013 | Hurowitz et al. |
| 8,484,215 | B2* | 7/2013 | Anderson ............. G06F 16/285 707/737 |
| 9,292,571 | B1* | 3/2016 | Kiryakov ............... G06F 16/284 |
| 9,734,162 | B2 | 8/2017 | Statchuk |
| 2007/0156734 | A1* | 7/2007 | Dipper ..................... G06F 16/20 |
| 2016/0055212 | A1* | 2/2016 | Young ................. G06F 16/2456 707/723 |
| 2017/0116307 | A1* | 4/2017 | Kapoor ................. G06F 16/213 |
| 2021/0034618 | A1* | 2/2021 | Lu ........................... G06F 17/15 |

OTHER PUBLICATIONS

"Merge—Data Management Toolbox", (2017), ARCGIS Desktop, http://pro.arcgis.com/en/pro-app/tool-reference/data-management/merge.htm, 3 pages.
Safra, "Integration of Multiple Geo-Spatial Datasets", (2006), Mapping and Geo-Information Engineering Technion—Israel Institute of Technology, ASPRS 2006 Annual Conference, 8 pages.
"Essentials of joining tables," ArcGIS Desktop, copyright 2018 Esri, accessed Nov. 16, 2021, 3 pages. https://desktop.arcgis.com/en/arcmap/10.3/manage-data/tables/essentials-of-joining-tables.htm.

* cited by examiner

*Primary Examiner* — Greta L Robinson
(74) *Attorney, Agent, or Firm* — Yee & Associates, P.C.

(57) ABSTRACT

A computer-implemented method for joining data sets with mismatched geographic location naming conventions is provided. The method includes identifying, by the computer, a first dataset and a second dataset as join candidates. The method also includes joining, by the computer, the first dataset and the second dataset when, each row of the first user dataset is associated with a single geographic identifier using a geographic knowledge dataset that includes a geographic name lookup table and each row of the second user dataset is associated with a single geographic identifier using the geographic knowledge dataset, wherein the geographic name lookup table includes a plurality of alias names for each of a plurality of unique geographic locations.

17 Claims, 5 Drawing Sheets

METHOD TO AUTOMATICALLY JOIN DATASETS WITH DIFFERENT GEOGRAPHIC LOCATION NAMING CONVENTIONS

BACKGROUND

The disclosure relates generally to computer systems and, more particularly, to computer automated methods for organizing data, and even more particularly, to computer automated methods for joining datasets with different geo location aliases.

A geographic (Geo) location can have many different aliases and different datasets may use different Geo location aliases to refer to the same location. For example, the United States of America may be commonly referred to as "US", "USA", "U.S.", "United States", "United States of America", "美国" in various kinds of datasets.

SUMMARY

According to one illustrative embodiment, a computer-implemented method for joining data sets with mismatched geographic location naming conventions is provided. The method includes identifying, by the computer, a first dataset and a second dataset as join candidates. The method also includes joining, by the computer, the first dataset and the second dataset when, each row of the first user dataset is associated with a single geographic identifier using a geographic knowledge dataset that includes a geographic name lookup table and each row of the second user dataset is associated with a single geographic identifier using the geographic knowledge dataset, wherein the geographic name lookup table includes a plurality of alias names for each of a plurality of unique geographic locations. According to other illustrative embodiments, a data processing system and computer program product for joining data sets with mismatched naming conventions for geographic locations are provided.

DETAILED DESCRIPTION

Figure 1:
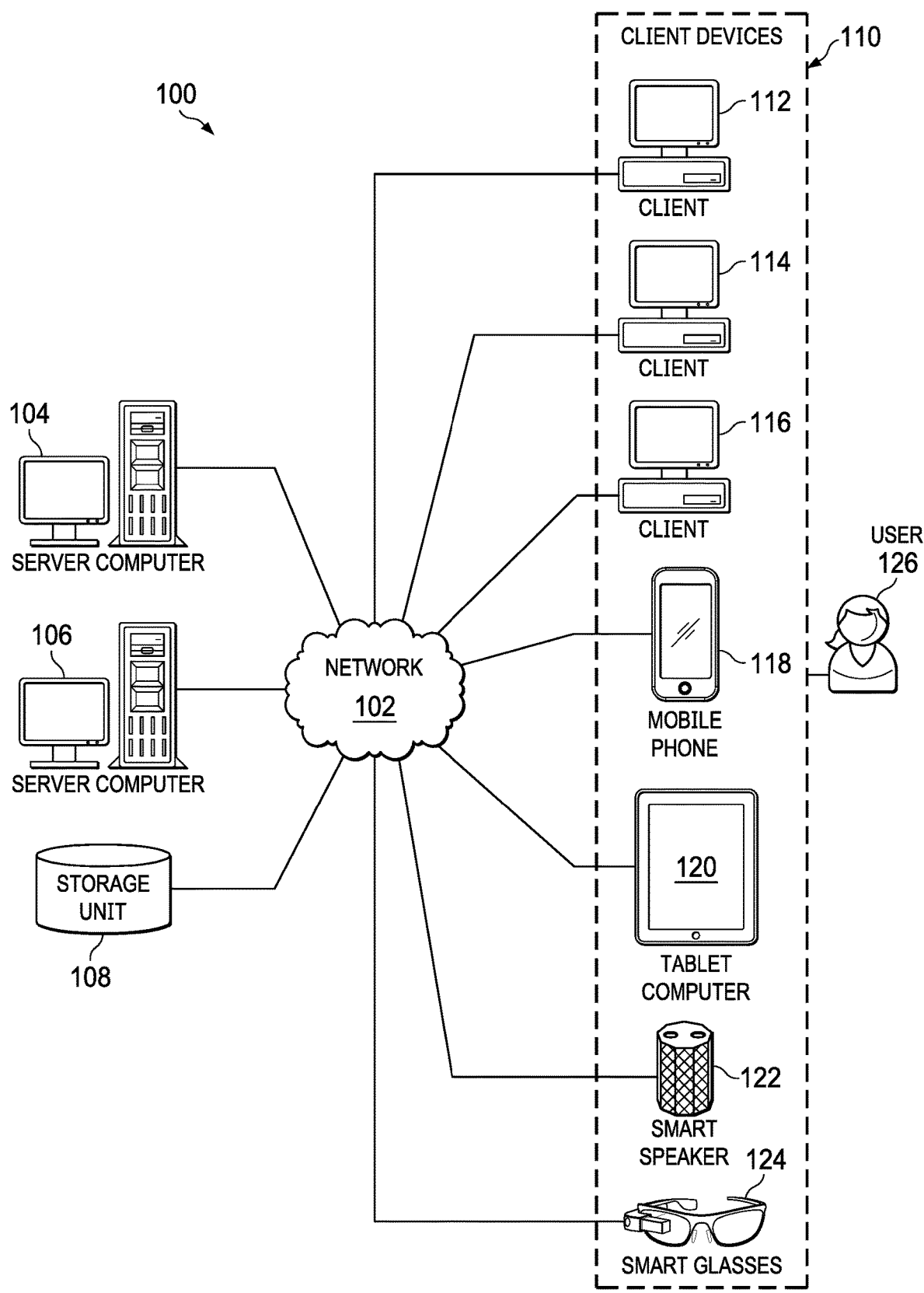
FIG. 1 is a pictorial representation of a network of data processing systems in which illustrative embodiments may be implemented.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In business analytics, more and more companies and users join multiple datasets by Geo locations or connect external data using Geo location names in order to gain a deeper insight into the data. For example, joining air pollution statistics data with hospital enrollment data can deepen the analysis and allow for the discovery of the contribution of environment pollutants to the incidence and prevalence of some diseases. As another example, in order to improve supply chain management, it may be desirable to join store inventory weather data by location to discover how weather has impacted the sales of seasonal products.

The illustrative embodiments recognize and take into account one or more considerations. For example, the illustrative embodiments recognize and take into account that it is very common that different datasets use different aliases/names to refer to the same location. Thus, the illustrative embodiments recognize and take into account that even when two datasets contain data for the same location, they could not be joined together as the geo location names are not the same. Furthermore, the illustrative embodiments recognize and take into account that it is common that two datasets do not have the same level of geo information. For example, one dataset has country and state fields, but the other dataset only has county and city fields. The illustrative embodiments recognize and take into account that users must go through lengthy manual data cleansing steps to make sure that the datasets to be joined have exactly the same name for the same location and that fields are all a match. The illustrative embodiments recognize and take into account that these extra data cleansing steps have dramatically affected productivity, limited product usability, and resulted in user dissatisfaction of the product.

The illustrative embodiments recognize and take into account that prior methods for joining datasets based on geographic location required that the field names from the tales to be joined be exactly the same and that the values are exact matches (including being case sensitive).

The illustrative embodiments recognize and take into account that it would be desirable to have a method, system, and computer program product that automatically reconciles differences in geographic location name aliases and/or mismatched sets of geographic location attributes in different data sets and joins the datasets.

In an illustrative embodiment, systems and methods of automatically joining multiple datasets in business analytic systems that use different geographic location aliases and/or have mismatched sets of geographic location attributes without extra time-consuming data cleansing steps are provided. In an illustrative embodiment, systems and methods for using a combination of techniques that provide for automatically joining datasets or for connecting to external data in which different geographic location aliases are used for the same location in the fields to be joined and/or the geographic location fields to be joined are at different levels.

The illustrative embodiments recognize and take into account that reasons joining tables in the prior art may fail is that values in the specified fields for the join do not match. Prior methods are case sensitive such that, for example, "NEW YORK" will not match "New York." The illustrative embodiment further recognize and take into account that in the prior art, each time a user tried to join two datasets with geographic location fields, the user had to go through lengthy manual data cleansing steps to ensure that the datasets satisfy the strict prerequisites, which significantly impacts the user's productivity and fostered user dissatisfaction.

Various illustrative embodiments use a combination of techniques that provide an approach to automatically join datasets or connect to external data in which different geographic location aliases are used for the same location in the fields to be joined and/or the geographic location fields to be joined are at different levels. As used herein, different levels refer to the different hierarchies with which a given geographic location corresponds. For example, New York City refers to the city, but also inherently specifies that the state is the state of New York in the country of the United States of America on the North American Continent in the Western hemisphere. Thus, in illustrative embodiments, one dataset may refer to locations at the city level while a different dataset may only refer to locations at the state or national level.

Various illustrative embodiments provide a unique way to organize geographic data including aliases, relationships and associate these data using abstract logical levels (concepts) which are stored in a datastore, such as a relational database. As used herein, an alias refers to the different names used to refer to the same unique geographic location. For example, "New York City" may also be referred to as "New York," "NEW YORK", "NY City," "NY", "the Big Apple", etc. Each of these aliases uniquely identifies the same geographic location. In an illustrative embodiment, when a user dataset is processed, the columns are classified into concepts and columns are recommended as join candidates based on the concepts of the column. Illustrative embodiments automatically normalize the different geographic aliases in user datasets to a canonical form and pads mismatched fields using a series of techniques that leverage the data stored in a geographic knowledge database. After that, in illustrative embodiments, a join query is automatically generated to connect user datasets using the geographic knowledge table as a bridge.

With illustrative disclosed embodiments, a business analytics system can allow a user to easily broaden and deepen a user's analysis and discover more insights by combining two or more datasets by geographic location data that have mismatched aliases and/or mismatched levels without having to go through lengthy and time-consuming data cleansing steps, thereby dramatically improving user productivity and providing better user satisfaction.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Further, client devices 110 can also include other types of client devices such mobile phone 118, tablet computer 120, smart speaker 122, and smart glasses 124. Client devices 110 can be, for example, computers, workstations, or network computers. In the depicted example, server computer 104 provides information, such as boot files, operating system images, and applications to client devices 110. In this illustrative example, server computer 104, server computer 106, storage unit 108, and client devices 110 are network devices that connect to network 102 in which network 102 is the communications media for these network devices.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). Network 102 may be comprised of the Internet-of-Things (IoT). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, multiple structured datasets arranged into columns and rows and containing geographic location data are stored on storage unit 108. An analyzer on, for example, server computer 104 or client computer 112 analyzes the datasets to determine whether the datasets can be joined.

Figure 2:
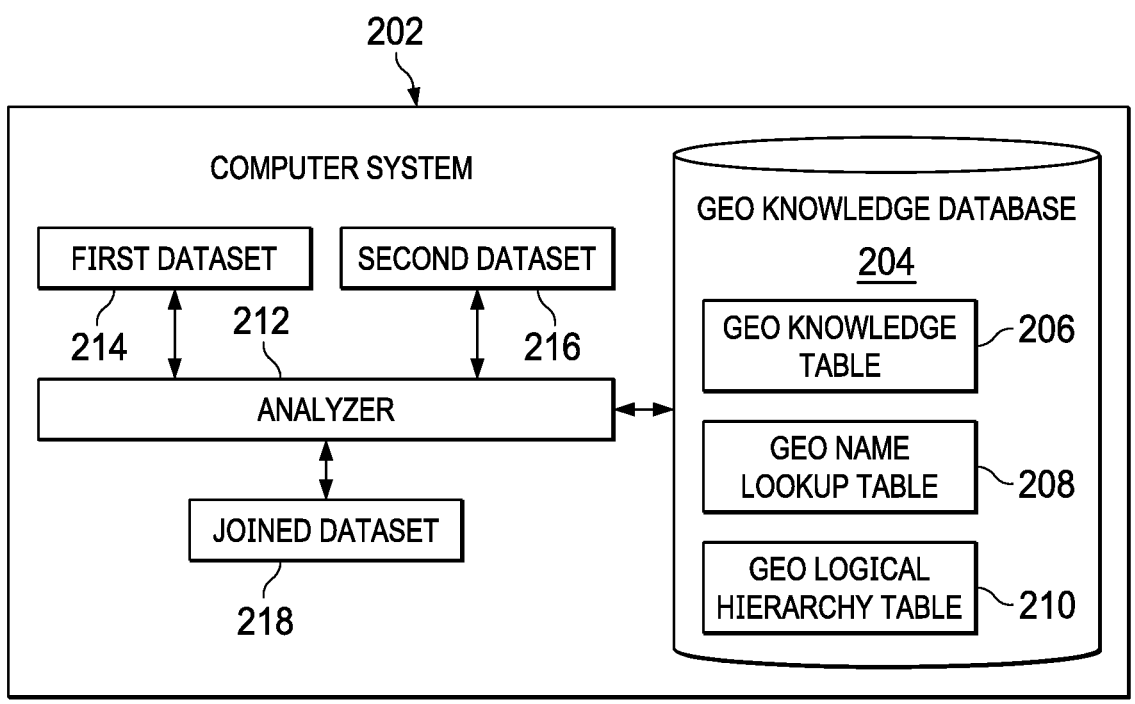
FIG. 2 is a diagram of a computer for joining datasets having mismatched aliases and/or mismatched hierarchical geographic levels as depicted in accordance with an illustrative embodiment.

Turning now to FIG. 2, a diagram of a computer for joining datasets having mismatched aliases and/or mismatched hierarchical geographic levels is depicted in accordance with an illustrative embodiment. Computer system 202 includes a geographic (Geo) knowledge database 204 and an analyzer 212. Geo knowledge database 204 includes a geo knowledge table 206, a geo name lookup table 208 and a geo logical hierarchy table 210. The Analyzer 212 uses the geo knowledge database 204 to join first dataset 214 and second dataset 216 to produce a joined dataset 218. The first dataset 214 and the second dataset 216 may have mismatched aliases and/or mismatched hierarchical geographic levels.

Figure 3:
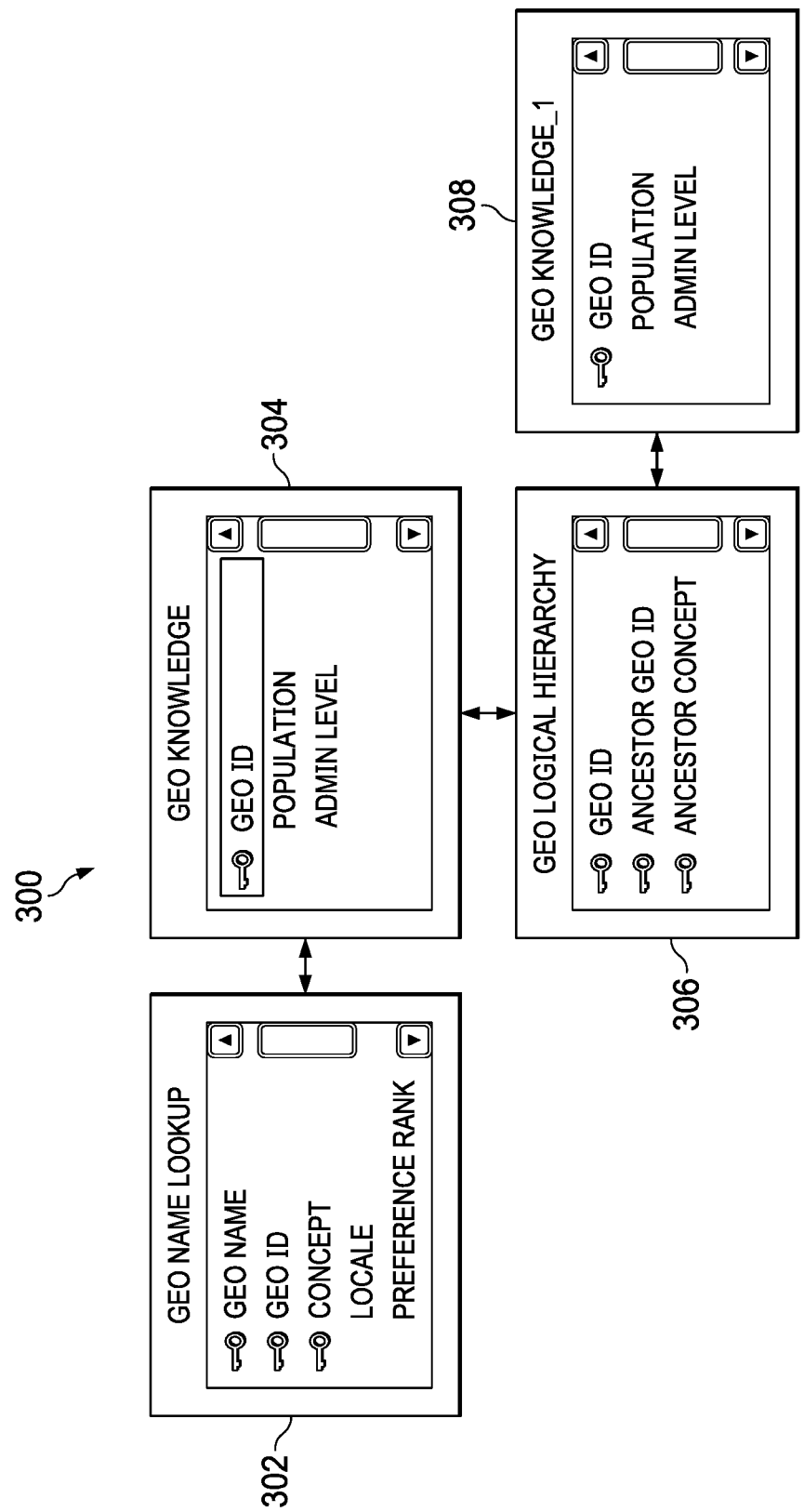
FIG. 3 is a diagram of a geo knowledge database depicted in accordance with an illustrative embodiment.

Turning now to FIG. 3, a diagram of a geo knowledge database is depicted in accordance with an illustrative embodiment. Geo knowledge database 300 may be implemented as geo knowledge database 204 depicted in FIG. 2.

Geo knowledge database 300 includes geo name lookup table 302, geo knowledge table 304, geo logical hierarchy 306 and a geo knowledge table_1 308.

The geo knowledge database preparation is typically performed once and then utilized multiple times each time two datasets are joined. In operation 1, a set of concepts is defined in an ontology to represent the abstract logical levels in Geo Hierarchy, which can be commonly used by all countries.

In operation 2, a Geo knowledge table 304 is created in which each row is identified by a unique location identifier (Geo ID), which can be treated as the standardized name of a location. The other fields are the additional features describing the location, such as administrative level, population, etc.

In operation 3, a Geo name lookup tables 302, 308 are created in which each row is uniquely identified by a compound primary key, which contains three fields, Geo Name, Geo ID, and Concept. Each alias for a location tupled with the Geo ID of the location and its abstract logical level (concept) is inserted as a record in the table. Geo Name field stores all the variations of the name for a location, including different cases, with or without diacritics, name in different languages. It can easily add new names or remove obsoleted names. A location can have multiple abstract logical levels (concepts). For example, Singapore can be both City and Country, each of which will be a record in Geo Name Lookup table.

In operation 4, a Geo Logical Hierarchy table 306 is created in which each row is uniquely identified by a compound primary key, which contains three fields, Geo ID, Ancestor Geo ID, Ancestor level Concept; the ancestors can be parent, grand-parent, and further level, each of which will be a record in Geo Logical Hierarchy table 306. The ancestors, as used herein, refer to higher levels that incorporate multiple lower levels within themselves. For example, a state or province is an ancestor to multiple cities and a state or province may be the child of a country.

The data is organized in such a way that the tables can be queried or joined at any abstract logical levels in the geo hierarchy.

Once the geo knowledge database 300 has been created, the geo knowledge database 300 can be used to join multiple datasets.

Figure 4:
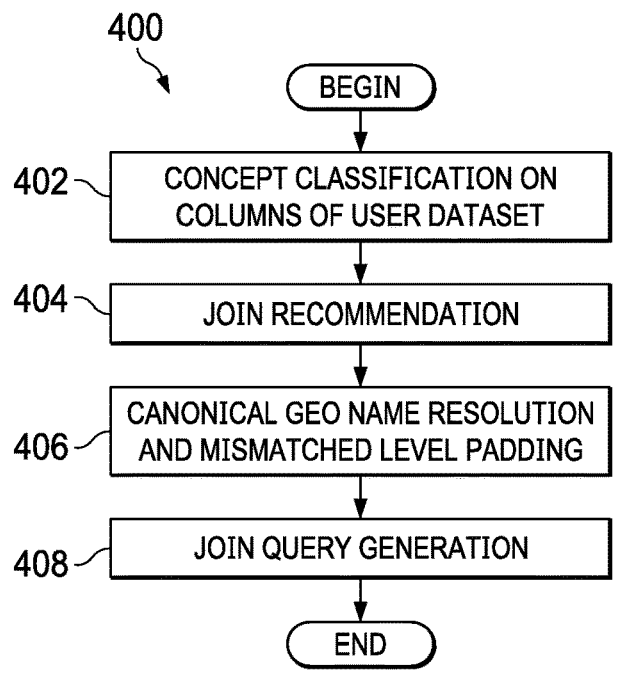
FIG. 4 is a flowchart of a join process depicted in accordance with an illustrative embodiment.

Turning now to FIG. 4, a flowchart of a join process is depicted in accordance with an illustrative embodiment. The method 400 begins with concept classification on columns of user dataset is performed (operation 402). In user dataset, for each column with data type as text, use the distinct value to query Geo name lookup table and count the occurrence of each concept. Then use the frequencies of concepts as an important factor to classify the concept of the column.

Next, a join recommendation is performed (operation 404). Even if two datasets have completely different column names for Geo data fields or mismatched Geo data fields, as long as the columns satisfy a set of rules for join based on concepts, the two datasets can be identified as join candidates.

Next, a canonical geo name resolution and mismatched level padding is performed (operation 406). For ambiguity detection, in operation a), join a user dataset with Geo Name Lookup table to check if each row in user dataset can be associated with single Geo ID. If yes, go to operation c; otherwise, it indicates that an ambiguity has been detected, and goes to operation b) disambiguation. In operation b), where disambiguation is performed if ambiguity is detected, in an illustrative embodiment, a combination of methods to disambiguate the ambiguous rows are used. These methods may include automatic unique geo identifier (ID) resolution, such as clustering algorithms to find common ancestor, name preference rank bias, population size bias, administration level bias, etc. these methods may also include user clarification. In operation c), canonical geo name column padding is performed. After operation a) and/or operation b), geo location information in each row contains enough information to uniquely identify single Geo ID. Illustrative embodiments then create a derived view, which enhances user dataset with Geo ID column. The Geo ID column can be used as canonical Geo name to join other datasets. In operation d), geo fields padding is performed if geo fields to be joined have mismatched levels. As unique Geo ID has been resolved for each location, if Geo fields to be joined have mismatched levels, this missing level can be automatically resolved by joining the user data with Geo logical hierarchy table using existing Geo information in the derived view.

Next, join query generation is performed (operation 408). As different Geo aliases have been normalized to Geo ID and mismatched fields have been padded, join query can be generated using Geo Knowledge table as the bridge table to connect two user datasets.

The following examples may aid in understanding the various illustrative embodiments. Consider the data in tables 1 and 2 below for the various examples. A snippet of dataset Sales contains sales information for each branch in the company is shown in Table 1 below:

TABLE 1

| Branch | Salesperson | Product Category | Sales |
|---|---|---|---|
| Montréal | Holly Morales | F-38347-208 | 3098080 |
| Oslo | Amber Bradley | F-38347-210 | 234589 |
| München | Leah Soto | R-28400-230 | 9375939 |
| London | Tony Vega | C-34632-360 | 98347989 |
| Milano | Tracey Owen | T-34736-123 | 978987 |
| São Paulo | Victoria Diamond | O-34843-407 | 767868 |

A snippet of dataset Expenses that contains all the expense information for each site in the company is shown in Table 2 below:

TABLE 2

| Branch Country | Branch State | Branch City | Office Rent | Travel Expense |
|---|---|---|---|---|
| Canada | Québec | Montreal | 823745 | 23745 |
| Norway | Østlandet | Oslo | 59379 | 9379 |
| Germany | Bavaria | Munich | 342434 | 42434 |
| United Kingdom | Greater London | London | 187611 | 87611 |
| Italy | Milan | Milan | 76512 | 6512 |
| Brazil | Sao Paulo | Sao Paulo | 198778 | 98778 |

In example 1, a user wants to automatically join the two datasets to calculate earnings. Without the disclosed methods and systems, these two tables cannot be joined directly since different names are used for the same city. Using disclosed methods and systems, from operation 402, dataset sales column branch has been tagged with the concept "city." Dataset expense columns "branch country," branch state," and "branch city" have been tagged with the concept "country," "state," and "city" respectively. From operation 404, a join recommendation is generated to suggest "sales.branch" to join to "expense.branch city" at the "city" abstract logical level. From operation 406, the system detects ambiguity on "London" in dataset "sales" shown in Table 1 since the city "London" is used in multiple different countries. After applying a combination of disambiguation algorithms, "London" is resolved as "London in the United Kingdom." After canonical geo name column padding, the "derived sales view" is created. A section of a materialized view looks as shown in Table 3 below:

TABLE 3

| Geo ID (City) | Branch (City) | Salesperson | Product Category | Sales |
|---|---|---|---|---|
| 100 | Montréal | Holly Morales | F-38347-208 | 3098080 |
| 200 | Oslo | Amber Bradley | F-38347-210 | 234589 |
| 300 | München | Leah Soto | R-28400-230 | 9375939 |
| 400 | London | Tony Vega | C-34632-360 | 98347989 |
| 500 | Milano | Tracey Owen | T-34736-123 | 978987 |
| 600 | São Paulo | Victoria Diamond | O-34843-407 | 767868 |

In the data set "Expenses," shown in Table 2, no ambiguity is detected. Thus, after canonical geo name column padding, the "derived expenses view" is created. A section of this view is shown in Table 4 below:

TABLE 4

| Geo ID (Country) | Branch Country | Geo ID (State) | Branch State | Geo ID (City) | Branch City (City) | Office Rent | Travel Expense |
|---|---|---|---|---|---|---|---|
| 101 | Canada | 101 | Québec | 100 | Montreal | 823745 | 23745 |
| 202 | Norway | 202 | Østlandet | 200 | Oslo | 59379 | 9379 |
| 303 | Germany | 303 | Bavaria | 300 | Munich | 342434 | 42434 |
| 404 | United Kingdom | 404 | Greater London | 400 | London | 187611 | 87611 |
| 505 | Italy | 505 | Milan | 500 | Milan | 76512 | 6512 |
| 606 | Brazil | 606 | Sao Paulo | 600 | Sao Paulo | 198778 | 98778 |

From operation 408, an SQL query can be generated to join "Derived Sales" and "Derived Expenses" on Geo ID (city).

In example 2, a user wants to automatically join the two datasets to calculate earnings at the state level. Without the disclosed systems and methods, these two tables cannot be joined directly since sales dataset does not have state information. However, using the illustrative embodiments of the disclosed systems and methods, many operations are the same as in Example 1 above except that from operation 406, after the geo fields padding, if geo fields are to be joined having mismatched levels, the derived sales view a portion of which is shown in Table 3 above, is padded with the "state" level resulting in a view a portion of which is shown in Table 5 below:

TABLE 5

| Geo ID (State) | State | Geo ID (City) | Branch (City) | Salesperson | Product Category | Sales |
|---|---|---|---|---|---|---|
| 101 | Québec | 100 | Montréal | Holly Morales | F-38347-208 | 3098080 |
| 202 | Østlandet | 200 | Oslo | Amber Bradley | F-38347-210 | 234589 |
| 303 | Bavaria | 300 | München | Leah Soto | R-28400-230 | 9375939 |
| 404 | Greater London | 400 | London | Tony Vega | C-34632-360 | 98347989 |
| 505 | Milan | 500 | Milano | Tracey Owen | T-34736-123 | 978987 |
| 606 | Sao Paulo | 600 | São Paulo | Victoria Diamond | O-34843-407 | 767868 |

From operation 408, a SQL query can be generated to join "derived sales" and "derived expenses" on "geo ID (state)."

Figure 5:
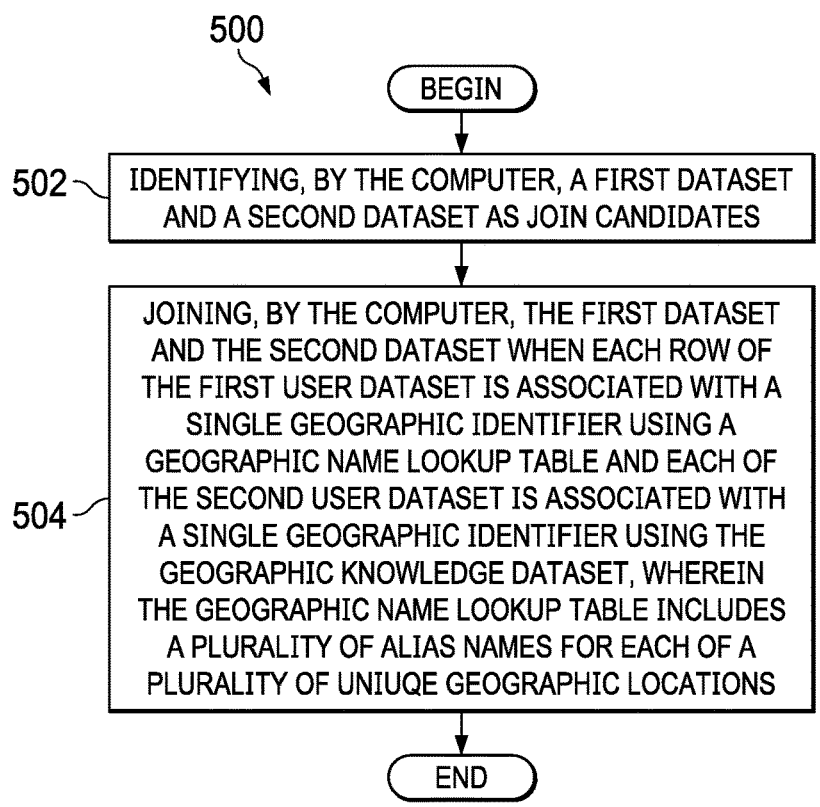
FIG. 5 is a flowchart of a method for joining two datasets depicted in accordance with an illustrative embodiment.

Turning now to FIG. 5, a flowchart of a method for joining two datasets is depicted in accordance with an illustrative embodiment. The method 500 begins by identifying, by the computer, a first dataset and a second dataset as join candidates (operation 502). Identifying the datasets as join candidates may be performed as described above in method 400 shown in FIG. 4. Next, the method 500 proceeds by joining, by the computer, the first dataset and the second dataset when, each row of the first user dataset is associated with a single geographic identifier using a geographic knowledge dataset including at least a geographic name lookup table and each row of the second user dataset is associated with a single geographic identifier using the geographic knowledge dataset, wherein the geographic name lookup table includes a plurality of alias names for each of a plurality of unique geographic locations (operation 504).

In illustrative embodiments, the method includes, when an ambiguous geolocation is determined in a first row in one of the first and second datasets, disambiguating using a clustering algorithm to find a common ancestor, name preference rank bias, population size bias, or administration level bias and associating the first row with a single geographic identifier. In illustrative embodiments, the method also includes adding a geographic identifier column to the joined datasets to create a derived view, wherein an entry for the geographic identifier column for a row in the joined datasets includes a unique geographic identifier for the row derived from the geographic name lookup table wherein the unique geographic identifier corresponds to multiple geographic aliases describing a same geographic location. In illustrative embodiments, the method also includes, when a first geographic field in the first dataset is mismatched with a second geographic field in the second dataset, automatically resolving a missing level by joining the first and second datasets with a geographic logical hierarchy table using existing geographic information in the derived view. In illustrative embodiments, the joining includes joining the first and second datasets using a geographic knowledge table as a bridge table to connect the first and second datasets. In illustrative embodiments, the geographic knowledge dataset further includes a geographic knowledge table, a geographic logical hierarchy table. In illustrative embodiments, the geographic knowledge table includes a plurality of rows in which each row is identified by a unique location identifier which is treated as a standardized name of a geographic location and wherein other fields in each row include identifying features of the geographic location. In illustrative embodiments, the identifying features include at least one of administrative level, population, nation, city province, state, county, and longitude and latitude. In illustrative embodiments, the geographic name lookup table includes a plurality of rows wherein each row is identified by a compound primary key which contains three fields, wherein the three fields include a geographic name, a geographic identifier, and a concept, wherein the concept includes an abstract logical level, wherein each alias for a location is tupled with the geographic identifier of the location and the concept, and wherein the geographic name field stores a plurality of variations of the name for a location. In illustrative embodiments, the geographic logical hierarchy table includes a plurality of rows, wherein each row is uniquely identified by a compound primary key, wherein the compound primary key includes at least three fields, wherein the at least three fields include a geographic identifier, an ancestor geographic identifier, and an ancestor level concept.

Figure 6:
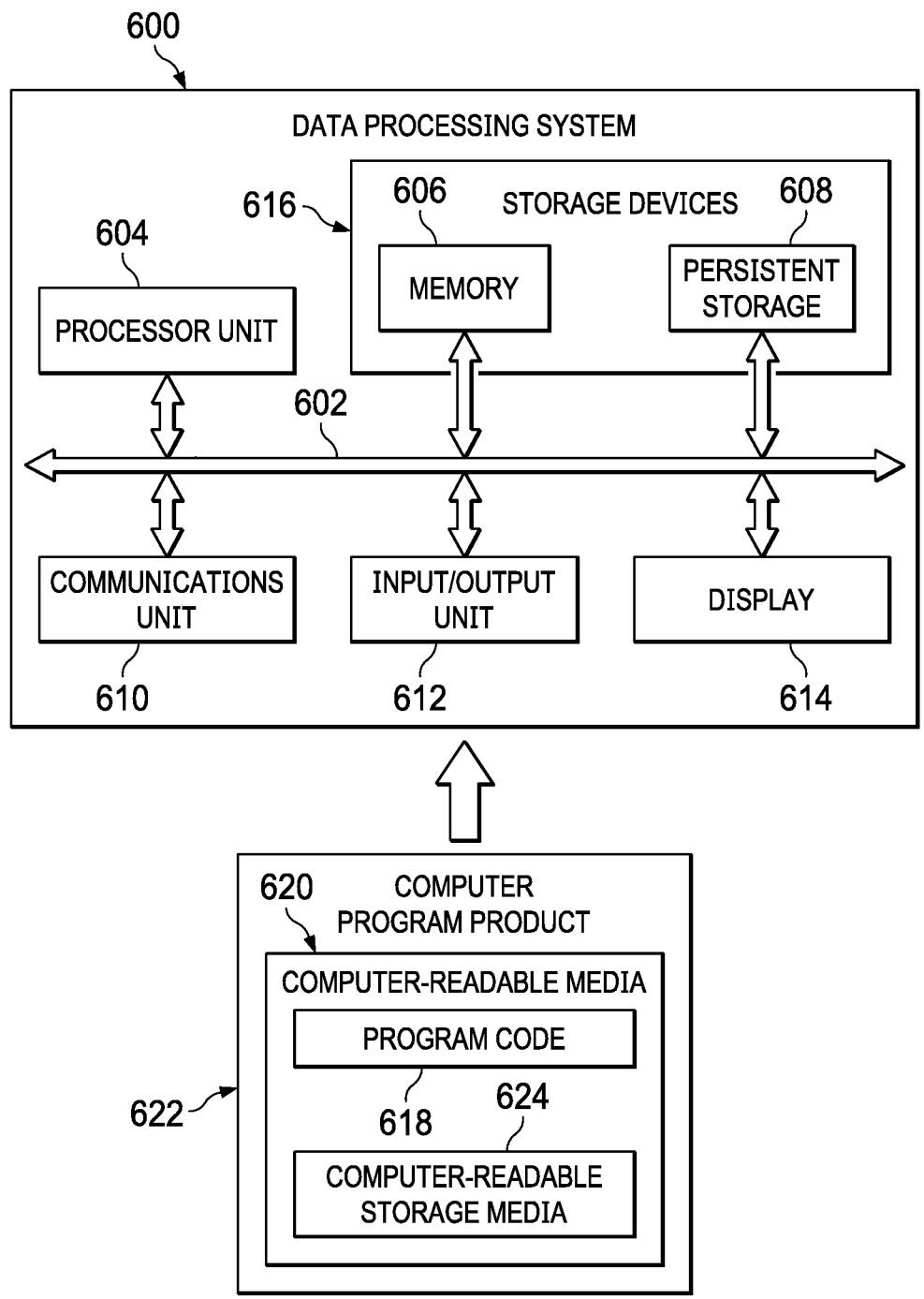
FIG. 6 is a block diagram of a data processing system in accordance with an illustrative embodiment.

Turning now to FIG. 6, a block diagram of a data processing system is depicted in accordance with an illustrative embodiment. Data processing system 600 can be used to implement server computer 104, server computer 106, and/or one or more of client devices 110, in FIG. 1. Data processing system 600 can also be used to implement computer system 202 in FIG. 2. Additionally, data processing system 600 can be used to implement the method 400 depicted in FIG. 4 and/or method 500 depicted in FIG. 5. In this illustrative example, data processing system 600 includes communications framework 602, which provides communications between processor unit 604, memory 606, persistent storage 608, communications unit 610, input/output (I/O) unit 612, and display 614. In this example, communications framework 602 takes the form of a bus system.

Processor unit 604 serves to execute instructions for software that can be loaded into memory 606. Processor unit 604 includes one or more processors. For example, processor unit 604 can be selected from at least one of a multicore processor, a central processing unit (CPU), a graphics processing unit (GPU), a physics processing unit (PPU), a digital signal processor (DSP), a network processor, or some other suitable type of processor. For example, further, processor unit 604 can may be implemented using one or more heterogeneous processor systems in which a main processor is present with secondary processors on a single chip. As another illustrative example, processor unit 604 can be a symmetric multi-processor system containing multiple processors of the same type on a single chip.

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, can be, for example, a random-access memory or any other suitable volatile or non-volatile storage device. Persistent storage 608 may take various forms, depending on the particular implementation.

For example, persistent storage 608 may contain one or more components or devices. For example, persistent storage 608 can be a hard drive, a solid-state drive (SSD), a flash memory, a rewritable optical disk, a rewritable magnetic tape, or some combination of the above. The media used by persistent storage 608 also can be removable. For example, a removable hard drive can be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that can be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs can be located in storage devices 616, which are in communication with processor unit 604 through communications framework 602. The processes of the different embodiments can be performed by processor unit 604 using computer-implemented instructions, which may be located in a memory, such as memory 606.

These instructions are referred to as program code, computer usable program code, or computer-readable program code that can be read and executed by a processor in processor unit 604. The program code in the different embodiments can be embodied on different physical or computer-readable storage media, such as memory 606 or persistent storage 608.

Program code 618 is located in a functional form on computer-readable media 620 that is selectively removable and can be loaded onto or transferred to data processing system 600 for execution by processor unit 604. Program code 618 and computer-readable media 620 form computer program product 622 in these illustrative examples. In the illustrative example, computer-readable media 620 is computer-readable storage media 624.

In these illustrative examples, computer-readable storage media 624 is a physical or tangible storage device used to store program code 618 rather than a medium that propagates or transmits program code 618.

Alternatively, program code 618 can be transferred to data processing system 600 using a computer-readable signal media. The computer-readable signal media can be, for example, a propagated data signal containing program code 618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 600 are not meant to provide architectural limitations to the manner in which different embodiments can be implemented. In some illustrative examples, one or more of the components may be incorporated in or otherwise form a portion of, another component. For example, memory 606, or portions thereof, may be incorporated in processor unit 604 in some illustrative examples. The different illustrative embodiments can be implemented in a data processing system including components in addition to or in place of those illustrated for data processing system 600. Other components shown in FIG. 6 can be varied from the illustrative examples shown. The different embodiments can be implemented using any hardware device or system capable of running program code 618.

Thus, illustrative embodiments of the present disclosure provide a computer implemented method, computer system, and computer program product for generating lyrics for poetic compositions. The method determines a theme randomly or from input and, from the theme, the method determines words that are associated with the theme and words that rhyme with the associated words according to a star schema approach. The method provides a filter and other mechanisms to tailor the output to fit a specified sentiment, topic, or other feature.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for joining data sets, comprising:
    identifying, by the computer, a first dataset and a second dataset as join candidates;
    joining, by the computer, the first dataset and the second dataset when, each row of the first user dataset is associated with a single geographic identifier using a geographic knowledge dataset comprising at least a geographic name lookup table and each row of the second user dataset is associated with a single geographic identifier using the geographic knowledge dataset, wherein the geographic name lookup table comprises a plurality of alias names for each of a plurality of unique geographic locations; and
    when an ambiguous geolocation is determined in a first row in one of the first and second datasets, disambiguating using a clustering algorithm to find a common ancestor, name preference rank bias, population size bias, or administration level bias and associating the first row with a single geographic identifier.

2. The method of claim 1, further comprising:
    adding a geographic identifier column to the joined datasets to create a derived view, wherein an entry for the geographic identifier column for a row in the joined datasets comprises a unique geographic identifier for the row derived from the geographic name lookup table wherein the unique geographic identifier corresponds to multiple geographic aliases describing a same geographic location.

3. The method of claim 2, further comprising:
    when a first geographic field in the first dataset is mismatched with a second geographic field in the second dataset, automatically resolving a missing level by joining the first and second datasets with a geographic logical hierarchy table using existing geographic information in the derived view.

4. The method of claim 3, wherein the joining comprises joining the first and second datasets using a geographic knowledge table as a bridge table to connect the first and second datasets.

5. The method of claim 1, wherein the geographic knowledge dataset further comprises a geographic knowledge table and a geographic logical hierarchy table.

6. The method of claim 5, wherein the geographic knowledge table comprises a plurality of rows in which each row is identified by a unique location identifier which is treated as a standardized name of a geographic location and wherein other fields in each row comprise identifying features of the geographic location.

7. The method of claim 6, wherein the identifying features comprise at least one of administrative level, population, nation, city province, state, county, and longitude and latitude.

8. The method of claim 5, wherein the geographic name lookup table comprises a plurality of rows wherein each row is identified by a compound primary key which contains three fields, wherein the three fields comprise a geographic name, a geographic identifier, and a concept, wherein the concept comprises an abstract logical level, wherein each alias for a location is tupled with the geographic identifier of the location and the concept, and wherein the geographic name field stores a plurality of variations of the name for the location.

9. The method of claim 5, wherein the geographic logical hierarchy table comprises a plurality of rows, wherein each row is uniquely identified by a compound primary key, wherein the compound primary key comprises at least three fields, wherein the at least three fields comprises a geographic identifier, an ancestor geographic identifier, and an ancestor level concept.

10. A computer system for joining data sets, the computer system comprising:
    a bus system;
    a storage device connected to the bus system, wherein the storage device stores program instructions; and
    a processor connected to the bus system, wherein the processor executes the program instructions to:
    identify a first dataset and a second dataset as join candidates;
    join the first dataset and the second dataset when, each row of the first user dataset is associated with a single geographic identifier using a geographic name lookup table and each row of the second user dataset is associated with a single geographic identifier using the geographic knowledge dataset comprising at least a geographic name lookup table, wherein the geographic name lookup table comprises a plurality of alias names for each of a plurality of unique geographic locations; and
    when an ambiguous geolocation is determined in a first row in one of the first and second datasets, disambiguating using a clustering algorithm to find a common ancestor, name preference rank bias, population size bias, or administration level bias and associating the first row with a single geographic identifier.

11. The computer system of claim 10, further comprising:
adding a geographic identifier column to the joined datasets to create a derived view, wherein an entry for the geographic identifier column for a row in the joined datasets comprises a unique geographic identifier for the row derived from the geographic name lookup table wherein the unique geographic identifier corresponds to multiple geographic aliases describing a same geographic location.

12. The computer system of claim 11, further comprising:
when a first geographic field in the first dataset is mismatched with a second geographic field in the second dataset, automatically resolving a missing level by joining the first and second datasets with a geographic logical hierarchy table using existing geographic information in the derived view.

13. The computer system of claim 12, wherein the joining comprises joining the first and second datasets using a geographic knowledge table as a bridge table to connect the first and second datasets.

14. A computer program product comprising:
a computer-readable storage medium including instructions for organizing data sets, the instructions comprising:
first program code for identifying a first dataset and a second dataset as join candidates;
second program code for joining the first dataset and the second dataset when, each row of the first user dataset is associated with a single geographic identifier using a geographic name lookup table and each row of the second user dataset is associated with a single geographic identifier using the geographic knowledge dataset comprising at least a geographic name lookup table, wherein the geographic name lookup table comprises a plurality of alias names for each of a plurality of unique geographic locations; and
third program code, when an ambiguous geolocation is determined in a first row in one of the first and second datasets, for disambiguating using a clustering algorithm to find a common ancestor, name preference rank bias, population size bias, or administration level bias and associating the first row with a single geographic identifier.

15. The computer program product of claim 14, further comprising:
third program code for adding a geographic identifier column to the joined datasets to create a derived view, wherein an entry for the geographic identifier column for a row in the joined datasets comprises a unique geographic identifier for the row derived from the geographic name lookup table wherein the unique geographic identifier corresponds to multiple geographic aliases describing a same geographic location.

16. The computer program product of claim 15, further comprising:
fourth program code, when a first geographic field in the first dataset is mismatched with a second geographic field in the second dataset, for automatically resolving a missing level by joining the first and second datasets with a geographic logical hierarchy table using existing geographic information in the derived view.

17. The computer program product of claim 16, wherein the joining comprises joining the first and second datasets using a geographic knowledge table as a bridge table to connect the first and second datasets.

* * * * *